No. 619,409. Patented Feb. 14, 1899.
A. HENDERSON.
INSECT RING SHIELD FOR TREES.
(Application filed Jan. 22, 1898.)

(No Model.)

Witnesses.

Inventor:
A. Henderson

UNITED STATES PATENT OFFICE.

ARCHIBALD HENDERSON, OF TORONTO, CANADA.

INSECT RING-SHIELD FOR TREES.

SPECIFICATION forming part of Letters Patent No. 619,409, dated February 14, 1899.

Application filed January 22, 1898. Serial No. 667,546. (No model.)

*To all whom it may concern:*

Be it known that I, ARCHIBALD HENDERSON, gentleman, of the city of Toronto, in the county of York, in the Province of Ontario, Canada, have invented certain new and useful Improvements in Insect Ring-Shields for Trees, of which the following is a specification.

My invention relates to improvements in insect-exterminating ring-shields for trees; and the object of the invention is to provide for trees and large shrubs a protection device whereby all sorts of insects, particularly the tussock-moth or caterpillar, which has been found lately to be so injurious and disastrous to the growth of the trees, may be prevented from ascending into the branches of the trees and procreating thereon; and it consists, essentially, of a ring provided with an upper downwardly-inclined flange and a bottom inwardly-projecting flange, such ring being a divided one having the opposing ends overlapping and connected together by a suitably-adjustable device, the interior of the ring next the tree being designed to be filled, preferably at the bottom, with oakum and above the oakum with powdered red cedar and above it with gravel for the purpose hereinafter more particularly explained.

Figure 1:
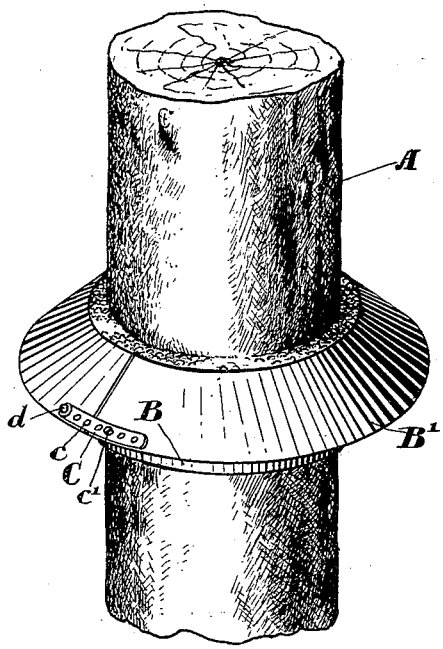
Figure 2:
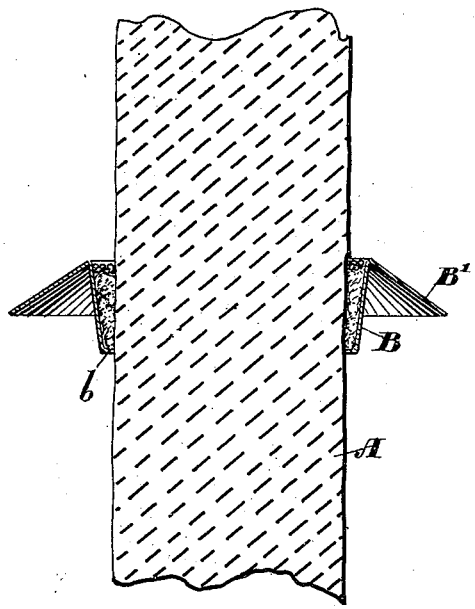
Figure 3:
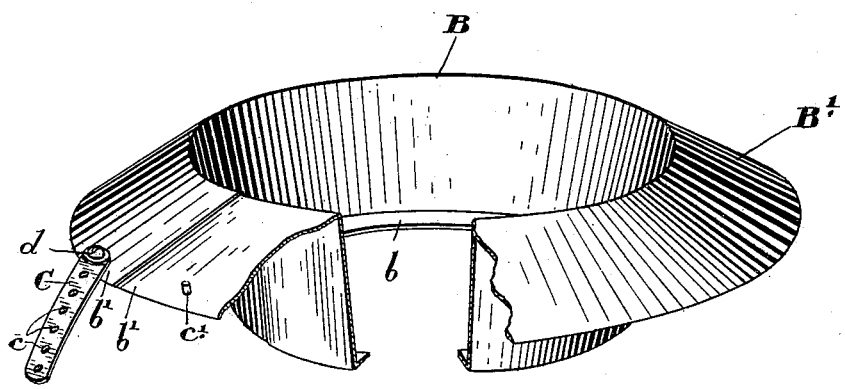

Figure 1 is a perspective view of a portion of a trunk of a tree provided with my improved protection and exterminating ring. Fig. 2 is a vertical section through Fig. 1. Fig. 3 is an enlarged detail of the flanged ring.

In the drawings like letters of reference indicate corresponding parts in each figure.

Only too well known to those familiar with the growing of trees, not only in large cities, but throughout the country, both in Canada and the United States, are the severe ravages made upon the trees and the disastrous effects produced by what is commonly known as the "tussock-moth." Heretofore it has been the custom to spray the trees in the spring in order to exterminate these destructive insects, and this necessarily involved a great deal of expense, time, and trouble. All large cities especially are fully aware of the difficulties heretofore experienced in respect to the destroying of trees by these insects, and it is with the object of providing a means of preventing the accumulation of these insects or their eggs upon the branches of the trees that my invention is particularly designed.

A represents a portion of the trunk of a tree. B is a ring formed, preferably, of sheet metal, although it may be formed of any other suitable material.

The ring B is preferably tapered from the top to the bottom, being narrower at the bottom, and provided with an inwardly-extending flange $b$. The top of the ring is provided with a flaring downwardly-inclined projecting flange B', forming an annular hood.

The ring B is a divided ring provided with overlapping ends $b'$ $b'$, extending throughout the overhanging flanged tapered portion and inwardly-extending lower flange. The ring B is made divided in this way, so that by twisting the ring from one end up and from the other end down it may be placed in position around the tree. In order to securely connect the overlapping ends together, I provide a metal connecting-link C, pivoted at $d$ on the flange on one side of the lap and having several holes $c$, one of which is designed to be placed over the pin $c'$ on the opposing end. By means of these holes the circumference of the ring may be increased as the tree grows, thereby enabling me to use my ring several years, which is an important desideratum, especially when it is taken into consideration that trees have to be sprayed every year. I find in practice that the overhanging flange B', having a downward incline, most effectually prevents the insects from passing from below to above it, and thus keeps them to the lower portion of the tree. It will therefore be seen that all danger from the insects, whether tussock-moth or caterpillar or any other insect, getting up into the tree and forming webs and laying eggs on the branches is effectually prevented, thus dispensing with any necessity of spraying.

In order to more effectually form a preventive means, I also fill in above the flange $b$, between the ring and the tree, first oakum, then red cedar in powdered form, and then gravel. The gravel is put at the top to prevent the sparrows and other birds from pecking at the red cedar and removing the same. The red cedar is utilized, as no insect will attempt to pass or approach near this wood. The oakum is put at the bottom, so as to prevent the powdered red cedar from falling out at the bottom, as of course the tree in its circumference is naturally frequently very uneven.

Although I describe red cedar, oakum, and gravel as the particular ingredients preferably applicable in my device, it will of course be understood that other ingredients having similar insecticide properties may be utilized, although for cheapness my ingredients are, as far as I am aware, the best.

What I claim as my invention is—

1. An insecticide device for trees comprising a ring designed to surround the trunk of the tree and provided with an outwardly downwardly slanting flaring flange extending from the top and forming a hood, and having the interior diameter of the ring greater than the trunk of the tree, a suitable filling located in the annular space formed between the inside of the ring and the tree, and an inwardly-extending flange formed at the bottom of the ring and designed to hold the filling in place as and for the purpose specified.

2. An insecticide device for trees comprising a ring designed to surround the trunk of the tree and provided with an outwardly downwardly slanting flaring flange extending from the top and forming a hood and having the interior diameter of the ring greater than that of the trunk of the tree and a filling designed to be inserted in the annular space between the ring and the tree and comprising a lower layer of oakum, a central layer of red cedar and a top layer of gravel as and for the purpose specified.

ARCHIBALD HENDERSON.

Witnesses:
B. BOYD,
A. H. McADAMS.